Dec. 13, 1927.
W. E. THAU
1,652,504
SYSTEM OF CONTROL
Filed Jan. 30, 1923
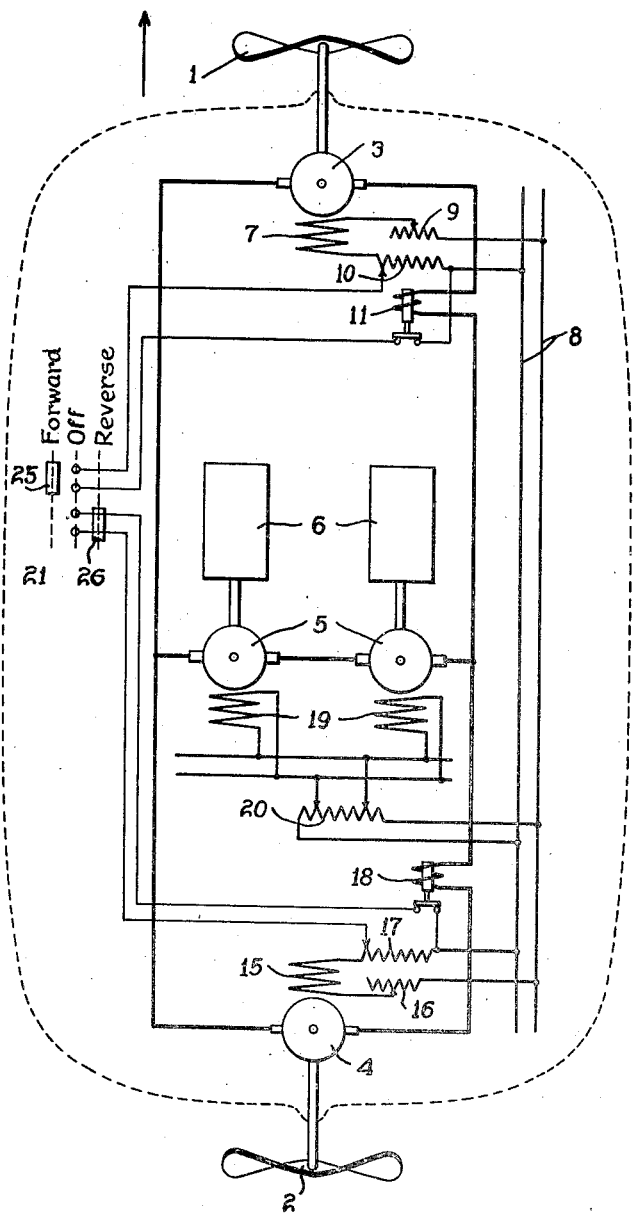
WITNESSES:
INVENTOR
Walter E. Thau.
BY
ATTORNEY Patented Dec. 13, 1927.

1,652,504

UNITED STATES PATENT OFFICE.

WALTER E. THAU, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed January 30, 1923. Serial No. 615,854.

My invention relates to systems of control and it has special relation to the control of electrically-driven vessels, such as ferry boats.

In the case of vessels employing the familiar Diesel-electric type of drive, including the Ward-Leonard system of control, the total energy returned to the prime mover in the event of reversal of a single propeller is almost sufficient to overcome the frictional losses in the Diesel engines. However, ferry boats are usually provided with both fore and aft propellers, which are mechanically separate, being driven by individual electric motors. For well-known reasons, the aft propeller is utilized to furnish the entire driving power for the vessel, while the fore propeller is adapted to be rotated at that particular speed which corresponds to the advancement of the propeller through the water without slip, this speed corresponding to about two-thirds or more of the aft-propeller speed.

It will be evident from the foregoing statements that, in the case of concurrent reversal of both fore and aft propellers of a ferry boat, the energy returned to the prime movers will be more than sufficient to overcome the frictional losses thereof, with the result that an excessive engine speed is liable to occur.

It is the object of my present invention, therefore, to prevent the undesirable condition just explained by so controlling or regulating one of the motors being reversed that substantially no energy will be returned to the main generator and, therefore, no racing of the Diesel engine driving the generator can possibly occur.

More specifically stated, the object of my invention is to provide automatic means in the form of relay devices for regulating the field-circuit current of one of the propeller-driving motors responsively to the armature current of that motor, whereby a relatively small or negligible current will be returned or consumed by that motor during the reversal period.

My invention may best be understood by reference to the accompanying drawing, the single figure of which is a diagrammatic view of the main and auxiliary circuits of a ship-propulsion system organized in accordance with my present invention.

Referring to the drawing, the system here shown comprises a double-ended ferry boat, or the like, having screws or propellers 1 and 2 located at the respective ends thereof and adapted to be driven by direct-current electric motors having armatures 3 and 4, respectively. The armatures 3 and 4 are connected in accordance with the well-known Ward-Leonard system, i. e. in parallel relation to receive energy directly from a plurality of main generators 5, which are preferably connected in series relation. Each of the generators 5 is adapted to be driven by a Diesel engine 6 or other internal-combustion engine, steam engine or the like, in accordance with a familiar practice.

The exciting field winding 7 for the propelling-motor armature 3 is adapted to be suitably energized from auxiliary bus bars or exciting circuit 8, through a plurality of variable resistors 9 and 10, the former being manually adjustable as desired, while the latter is automatically controlled by means of a relay device 11, as hereinafter set forth in detail.

The other propelling-motor armature 4 is provided with a similar field winding 15, which is likewise adapted to be energized from the auxiliary bus bars 8 through a manually variable rheostat 16 and a second resistor or rheostat 17 that is adapted to be automatically controlled through the agency of a relay device 18.

The main generators 5 are provided with suitable field windings 19, which may be controlled in a well-known manner by means of a reversible rheostat 20, energy being supplied from the auxiliary bus bars 8.

One portion of the manual control equipment comprises a master controller 21 or the like, which is provided with a pair of contact segments 25 and 26 that respectively correspond to forward and reverse operation of the ferry boat, as indicated by the respective legends.

The resistor 17 in the circuit of motor field winding 15 is adapted to be short-circuited when the master controller 21 is actuated to its reverse position and the relay 18 concurrently occupies its closed or low-current position. Similarly, the resistor 10 in the circuit of the motor field winding 7 is adapted to be short-circuited when the master controller 21 occupies its forward position and the relay device 11 concurrently occupies its low-current or closed position.

The operation of my invention may be set forth as follows: The forward direction of the ferry boat may be assumed as indicated by the arrow, corresponding to which direction the propeller 1 is the fore propeller of the boat for the time being and the other propeller 2 is the aft or driving propeller, operating at about three-halves of the speed of the fore propeller 1, as previously explained. Under such operating conditions, the master controller 21 occupies its position marked "forward" and other corresponding control operations have been completed in accordance with well-known principles. Since such other details of operation are irrelevant to the present invention, I have not deemed it necessary to illustrate or describe them further.

When it is desired to reverse the direction of operation of the ferry boat, the master controller 21 is reversed and the reversing rheostat 20 is manipulated, in the usual way, to directly reverse the excitation of the generator field windings 19 and thus reverse the direction of voltage imposed upon the propeller-driving armatures 3 and 4. The two propeller-driving motors consequently slow down, whereby a certain amount of energy will be returned to the main generators 5 and thence to the Diesel engines 6.

However, to prevent the return of an excess amount of power, for reasons previously set forth, the relay device 18 becomes effective to so regulate the excitation of the field winding 15, corresponding to the aft propeller 2, that a relatively small or substantially negligible current is actually returned by the motor armature 4 to the generators 5 during such reversal period.

The action of the relay device 18 during this period may be described as follows. Whenever the current in the circuit of the motor armature 4 tends to rise above a predetermined limit, the actuating coil of the relay device 18 is sufficiently energized to lift the relay to its open position, whereby the resistor 17 is inserted in circuit with the motor field winding 15 to correspondingly reduce the excitation thereof. Accordingly, the motor-armature current decreases to such a degree that the relay device 18 is permitted to drop and bridge the corresponding stationary contact members. Since the contact segment 25 of the master controller 21 occupies a position bridging the corresponding control fingers, a short-circuit for the resistor 17 is thus established to permit the current traversing the field winding 15 to again increase. The armature current then tends to again rise, and the cycle of operation just described is rapidly repeated. In this way, the excitation of the field winding 15 is automatically regulated in accordance with the current traversing the motor armature 4 to prevent such armature current from rising above a predetermined low value.

As a result, the total energy returned by both propeller-driving armatures 3 and 4 during the reversal period is insufficient to overcome the frictional losses in the prime movers, whereby the racing or excessive speed thereof is absolutely prevented.

Without further explanation, it will be appreciated that a similar operation takes place upon the next reversal of the direction of operation of the ferry boat, in which case, the master controller 21 occupies its forward position and the relay device 11 thus becomes operative to automatically control the resistor 10, in circuit with the field winding 7 of the propeller-driving armature 3.

By reason of the provision of the control circuits through the master controller 21, only one of the relay devices 11 and 18 is effective at any one time.

It will be understood that, if desired, the master controller 21 and the reversing rheostat 20 may be so combined or interlocked that a single manual operation will control both devices.

My invention thus permits the use of the familiar Ward-Leonard system of control and the reversal of the propeller driving motors without having to resort to additional switches in the armature circuits or other expensive or complicated expedients. The relay devices 11 and 18 may be so proportioned that they will operate to automatically prevent the motor armature currents from actually reversing, or the relay devices may be adjusted to prevent the current, though reversed, from building up beyond a relatively small value.

I do not wish to be restricted to the specific circuit connections or arrangement of parts herein set forth, as various modifications thereof may be effected without departing from the spirit and scope of my invention. I desire, therefore, that only such limitations shall be imposed as are indicated by the appended claims.

I claim as my invention:

1. In a ship-propulsion system, the combination with a plurality of propellers, of a plurality of parallel-connected motors for respectively driving said propellers, at different speeds, and a relay device responsive to the current traversing only the armature circuit of the motor corresponding to the higher-speed propeller for regulating the field excitation of that motor during reversal periods.

2. In a ship-propulsion system, the combination with a propeller located at each end of the ship, of a plurality of parallel-connected motors for respectively driving said propellers at materially different speeds, means for reversing the operation of said motors, and means operative during such reversal for preventing the current traversing only the motor corresponding to the higher speed propeller from exceeding a predetermined value.

3. In a ship-propulsion system, the combination with a propeller located at each end of the ship, of a plurality of parallel-connected motors for respectively driving said propellers at materially different speeds, and a relay device responsive only to the armature current of the motor corresponding to the higher-speed propeller for regulating the field excitation of that motor during reversal periods to prevent such armature current from exceeding a predetermined value.

4. In a control system, the combination with a plurality of parallel-connected dynamo-electric machines, of a plurality of relay devices connected in the respective load circuits of said machines for regulating the field excitation thereof, and means for controlling the direction of operation of said machines and for selectively rendering the one or the other of said devices ineffective.

5. In a control system, the combination with a plurality of dynamo-electric machines operating at materially different speeds, of a plurality of relay devices connected in the respective armature circuits of said machines for regulating the field excitation thereof, means for reversing the operation of said machines, manually operable means for selectively rendering ineffective the relay device corresponding to the lower-speed machine for either direction of operation.

6. In a ship-propulsion system, the combination with a plurality of propellers, of a plurality of motors for respectively driving said propellers, a plurality of relay devices connected in the respective armature circuits of said motors for regulating the field excitation thereof, and means for controlling the direction of operation of said propellers and for rendering the one or the other of said relay devices ineffective.

7. In a ship-propulsion system, the combination with a propeller located at each end of the ship, of a plurality of motors for respectively driving said propellers at different speeds, a plurality of relay devices connected in the respective armature circuits of said motors for regulating the field excitation thereof, and a controller having positions corresponding to the direction of operation of the ship for respectively rendering effective the relay device corresponding to the higher-speed propeller for a predetermined direction of ship travel.

8. In a ship-propulsion system, the combination with a propeller located at each end of the ship, of a plurality of motors for respectively driving said propellers, a generator for supplying energy to said motors, a Diesel engine for driving said generator, means for reversing the operation of said motors, and load responsive means operative automatically during such reversal for limiting the return of energy from one only of said motors through said generator to said Diesel engine.

9. In a ship-propulsion system, the combination with a propeller located at each end of the ship, of a plurality of motors for respectively driving said propellers at different speeds, a generator for supplying energy to said motors, a Diesel engine for driving said generator, means for reversing the operation of said motors, and a relay device energized by the load current of the higher-speed motor only for regulating the field excitation thereof during such reversal to prevent the return of sufficient energy through said generator to said Diesel engine to cause excessive speed thereof.

In testimony whereof, I have hereunto subscribed my name this 25th day of January, 1923.

WALTER E. THAU.